United States Patent

[11] 3,619,164

| [72] | Inventors | William A. Erby<br>Alburtis;<br>Robert A. Walde, Emmaus, both of Pa. |
|------|-----------|---|
| [21] | Appl. No. | 654,989 |
| [22] | Filed | July 21, 1967 |
| [45] | Patented | Nov. 9, 1971 |
| [73] | Assignee | Air Products and Chemicals, Inc.<br>Philadelphia, Pa.<br>Continuation-in-part of application Ser. No. 541,096, July 8, 1966. |

[54] METHOD OF CONTROLLING GROWTH OF WOODY JUNGLE PLANTS
4 Claims, No Drawings

| [52] | U.S. Cl. | 71/70, 71/82, 71/84 |
|------|----------|---|
| [51] | Int. Cl. | A01n 13/00 |
| [50] | Field of Search | 71/70, 92, 115, 69, 74, 72, 84 |

[56] References Cited
UNITED STATES PATENTS

| 3,130,034 | 4/1964 | Culver | 71/69 |
|-----------|--------|--------|-------|
| 3,285,925 | 11/1966 | Johnston et al. | 71/92 X |
| 3,397,049 | 8/1968 | Beatty | 71/69 X |
| 3,472,004 | 10/1969 | Erby et al. | 47/1.7 |

*Primary Examiner*—James O. Thomas, Jr.
*Attorneys*—B. Max Klevit and Barry Moyerman

ABSTRACT: Application of effective amounts of 2,3,5,5,5 pentachloro-4-keto pentenoic acid, along or in synergistic combination with arsenic acid or dimethyl arsenic acid to woody jungle plants in situ causes quick wilting of leaves and subsequent defoliation of the plants which action makes observation of the jungle floor possible over a long period of time which begins shortly after application with the onset of wilting.

METHOD OF CONTROLLING GROWTH OF WOODY JUNGLE PLANTS

CROSS-REFERENCE TO RELATED APPLICATION

This application is a continuation-in-part of our prior copending application Ser. No. 541,096 filed Apr. 8, 1966.

BACKGROUND OF THE INVENTION

1. Field of the Invention

This invention relates to the regulation of woody plant function with compositions comprising a particular organic compound. More particularly, it relates to a method of treating woody jungle plants so as to destroy their ability to provide a foliar canopy over the jungle floor, said method utilizing the plant growth regulating characteristics of 2,3,5,5,5 pentachloro-4-keto pentenoic acid.

2. Description of the Prior Art

In tropical and semitropical countries, where jungles occupy large portion of the terrain, techniques of warfare are greatly affected by the natural screening which such jungles provide for material and troop movements. This is particularly true where a large force, having air superiority, attempts to utilize this superiority against guerrila forces operating in such obscured jungle terrain. The effectiveness of the operation is a direct function of the ability of reconnaissance units to observe and follow the ground actions of the opposing forces. Most often such observation is aerial in nature and is hampered, if not rendered impossible, by jungle foliage. Consequently, such foliage often neutralizes or eliminates logistic advantages which would otherwise accrue from the fuller utilization of air power.

It has now become customary in the conduct of such warfare to attempt to defoliate such jungle areas so that troop movement can be observed. Defoliants which are currently used include, for example, cacodylic acid, 2,4-dichlorophenoxyacetic acid (i.e. 2,4–D), 2,4,5-trichlorophenoxyacetic acid (i.e., 2,4,5–T), derivatives of picolinic acid and mixtures thereof. All of these compositions require a period of several days after aerial application before there is any significant decrease in the jungle foliar canopy. When the decrease comes, it is in the form of desiccation and/or defoliation and, only then is observable penetration of the canopy achieved. The military disadvantages of such a time-lag are obvious.

Further, it is desirable that the chemical applied for defoliation also inhibit recovery and regrowth of foliage for as long a time as possible. It is not usually economically feasible to apply phytotoxic concentrations of these materials and consequently, those having the longest period of regrowth inhibition at nonphytotoxic defoliating levels are most desirable.

SUMMARY OF THE INVENTION

Briefly summarized, the invention relates to a method of destroying the visual impediment of a canopy of jungle foliage by causing the foliage to wilt and then drop off the woody jungle plants. This method comprises the in situ application of an amount of 2,3,5,5,5-pentachloro-4-keto pentenoic acid sufficient to cause wilting to occur within 6 hours and defoliation to occur from about 6 to 14 days from the time of application. Generally, the effective amount of active ingredient necessary to achieve these desired results ranges from about 6 to 24 lbs. of active ingredient per acre. This same application inhibits foliation for about a month. Higher quantities may prevent regrowth for a longer period of time, and, if sufficiently large amounts are used, death may result. When mixed with other phytotoxic ingredients lesser amounts may be required to produce given results.

Additionally, synergistic formulations comprising said polychloropentenoic acid and at least one compound selected from the group consisting of dimethyl arsenic acid and arsenic acid are within the scope of the invention and can be used for the purposes indicated above.

Accordingly, it is an object of the invention to provide a method for first rendering less effective and then eliminating a foliar jungle canopy which impedes aerial observation of activities on the floor of the jungle.

It is also an object of the invention to provide a method of controlling the growth of woody plants of a type found in tropical and subtropical jungles, said growth control varying from just causing fast wilting of foliage, at one extreme, to causing death of the plant at the other extreme, depending upon the weight of application and the ingredients of the composition.

An additional object of the invention is to provide compositions for use in a method of jungle defoliation which utilize 2,3,4,5,5-pentachloro-4-keto pentenoic acid, alone, in combination with other active ingredients (e.g., 2,4–D and/or 2,4,5–T) or in synergistic combination with selected arsenic compounds.

While the present emphasis is directed toward military applications, many peacetime uses are obviously within the scope of the invention. These include, for example, control of jungle like brush in agricultural applications and increasing admission of sunlight to jungle floors to permit cultivation thereof.

These and other objects of the invention will be apparent to those skilled in the arts of chemistry and jungle warfare from a consideration of the exemplary description which follows. It should be appreciated that neither the abstract of the disclosure nor the summary of the invention above is intended to constitute a limitation on its extent. On the contrary, they are inserted merely as aids in information retrieval. Therefore, the true scope of the invention is to be determined only by reasonable interpretation of the appended claims in the light of the foregoing text and the following description.

DESCRIPTIONS OF THE PREFERRED EMBODIMENTS

The active ingredient used in the instant invention is a composition comprising predominantly cis-2,3,5,5,5-pentachloro-4-keto pentenoic acid. The compound may be represented by the following structural formula:

(I)
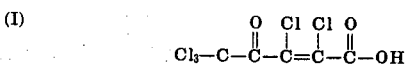

Various means are available for the preparation of this material. Methods are disclosed by Zincke in "Berichte der Deutsche Chemische Gesellschaft," 23, 240 (1890); 24, 916 (1891); 25, 2221 (1892); 26, 506 (1893); and 26, 317 (1893).

Another method of preparing this compound is included in the subject matter of the copending parent patent application, referred to above. Briefly, the method of preparation disclosed in said patent application is the direct chlorination of levulinic acid over an extended period of time while raising the temperature gradually from about 50° C. to the region of about 250° C. Reaction products contain the above-identified compound along with related organic compounds. A typical "active ingredient" used for practicing the instant invention comprises, for example, 90.4 wt. percent cis, 2,3,5,5,5-pentachloro-4-keto pentenoic acid, 2.0 percent dichloromaleic anhydride and 7.6 percent tetrachloro-4-keto pentenoic acid. As used herein, the term "active ingredient" means a composition of this type, wherein the activity is due predominantly to the polychloro pentenoic acid components.

Solid compositions may be prepared in the form of dusts, wettable powders or granules by mixing the active ingredient with a surfactant and/or one or more finely divided solid carriers such as, for example, talc, clay, pyrophyllite, silica and fuller's earth. Solid compositions may be applied directly to the woody plant containing areas by aircraft or the solid composition may be dispersed in water and applied as an aqueous dispersion.

Alternatively, the active ingredient can be prepared as a liquid concentrate for dispersion in a larger body of liquid. Solvents such as xylene, alkylated napthalene and other hydrocarbons and mixtures thereof may be used in such concentrates. Suitable emulsifying agents may also be used such as, for example, the isopropyl amine salts of $C_8$–$C_{14}$ alkyl benzene sulfonates and other conventional emulsifying agents. Solubility of the active ingredients in such formulations may be further increased by the addition of glycols such as ethylene or propylene glycol as well as oxyethylated and/or oxypropylated derivatives thereof. Surfactants found particularly beneficial for making spontaneously emulsifiable formulations are mixtures of long chain emulsifying organic acids and highly oxyethylated long chain alcohols. All of these formulations, as well as equivalent formulations, serve to provide a convenient means for conveying the desired quantity of active ingredient to the jungle growth and also give the composition, as applied, the characteristic of penetrating into the cell structure of the woody plant.

Two formulations, exemplary of those which may be used in the practice of the invention, wherein the "active ingredient" is solely the pentenoic acid discussed above, are given below. Formula I is for a spontaneously emulsifiable liquid and Formula II is for a water dispersible liquid.

FORMULA I

| | | |
|---|---|---|
| Active ingredient | 35% | by wt. |
| Propylene glycol | 10% | by wt. |
| Emulsifier | 6.5% | by wt. |
| Xylene | 48.5% | by wt. |
| | 100.0% | |

FORMULA II

| | | |
|---|---|---|
| Active ingredient | 35% | by wt. |
| Propylene glycol | 10% | by wt. |
| Emulsifier (isopropyl amine salt of dodecyl benzene sulfonate) | 6.5% | by wt. |
| Xylene | 48.5% | by wt. |
| | 100.0% | |

Both of the above formulations contain about 3 lbs. per gallon of active ingredient and formulations can be varied to provide a range of concentrations of active ingredient from about 2 to 4 lbs. per gallon. These liquid formulations may be diluted with water to provide solutions suitable for spraying by aircraft over jungle areas. For such application, it is preferred to use spray volumes which are as small as possible on the order of 3 to 8 gallons per acre. Thus, for example, if one desired to apply Formula II at a rate of 120 of active ingredient per acre, using a spray volume of 8 gallons per acre, it would be necessary to use a mixture of 4 gallons of the formula and 4 gallons of water for preparation of the spray.

Several equal areas of a subtropical jungle containing woody plants (such plants may include, for example members of the genera Psiduim, Gossypium, Octea, Olea, Quercus, Guarea, Farrietia, Diospyros, Rhizophora, etc.) were sprayed, respectively, with 6, 12 and 24 pounds per acre of active ingredient at spray volumes of 10 gallons per acre. Wilting occurred within 6 hours making observation of targets previously concealed by the foliar canopy possible. Thereafter defoliation occurred as tabulated below:

TABLE I

| Rate of Active Ingredient Application | Percent Defoliation After | | |
|---|---|---|---|
| | 3 days | 1 week | 2 weeks |
| 60/acre | 0 | 26 | 88 |
| 120/acre | 0 | 23 | 87 |
| 230/acre | 0 | 60 | 90 |

After 4 weeks, in all instances, regrowth began to occur without further defoliation of new growth and percent defoliation decreased. During the entire period beginning some 6 hours after application, and ending after significant regrowth, visual observation of the jungle floor was possible.

Another jungle area was tested using (a) 24 pounds per acre of active ingredient at a spray volume of 10 gallons per acre and (b) a mixture comprising 240/acre of active ingredient and 60/acre of 4 amino 3,5,6 trichloro picolinic acid (picloram). Wilting again occurred within 6 hours in both cases by the following observation was made with respect to desiccation and defoliation of plant growth.

TABLE II

| | Percent Desiccation/Defoliation After | | | |
|---|---|---|---|---|
| Material | 3 days | 1 week | 2 weeks | 1 month |
| "active ingredient" | 60 | 70 | 82 | 79 |
| mixture | 62 | 83 | 91 | 92 |

By comparison with data indicating the performance of 4 amino 3,5,6 trichloro picolinic acid alone, it was determined that the combination does not enhance the ability of the active ingredient to produce quick initial wilting of foliage but does increase the degree of plant phytotoxicity which occurs with the passage of time, particularly after at least 1 month has passed. The above example is merely illustrative of combinations of the active ingredient with other phytotoxicants where both rapid and persistent phytotoxic effects are desired. While the compounds may be applied seriatim, single formulations are preferred to minimize application costs. The phase compatibility necessary for such formulations, if not inherently present, may be obtained with conventional emulsification techniques by appropriate selection of surfactants and solvents. Briefly then, the active ingredient may be applied alone or in combination with other phytotoxicants, individually or in admixture.

Other combinations of the active ingredient and known phytotoxic ingredients are exemplified by the conjunctive use of the active ingredient and 2,4–D and/or 2,4,5–T and their derivatives. A typical composition of this type, in an amount sufficient for 1 acre, utilizes 240 of active ingredient and 300 of a 50:50 (weight percent) mixture of the butyl esters of 2,4–D and 2,4,5–T. The latter mixture has a density of 10.640/gallon and is often designated "orange" by the military. The combined phytotoxicants, when diluted to appropriate spray volume and applied to jungle growth, produces the following results:

after 3 days—62% wilting and desiccation
after 3 months—80% defoliation with 10% residual desiccation (i.e., leaves desiccated but still attached).

By comparison, "orange" alone at the 300/acre level produces the following results:

By comparison, "orange" alone at the 300/acre level produces the following results:

after 3 days—no visible effect
after 2 weeks—65% desiccation and defoliation
after 3 months—75% defoliation with 25% green regrowth The active ingredient, when used alone at the 240/acre level produces the following results:

The active ingredient, when used alone at the 240/acre level produces the following results:

after 3 days—60% wilting and/or desiccation
after 2 weeks—93% desiccation or defoliation
after 3 months—25% defoliation, substantial regrowth occurring.

The combination treatment with the active ingredient and the mixture of 2,4–D and 2,4,5–T give the advantages of rapid wilting to render the foliar canopy ineffective, quantitative defoliation and long lasting regrowth inhibition.

The active ingredient, when combined with particular phytotoxic compounds, produces synergistic as distinguished from additive effects. Such combinations are discussed below.

Mixtures containing the active ingredient and an arsenic acid or dimethyl arsenic acid synergize the wilting, defoliating and phytotoxic action on woody plants. For instance, the following data was obtained with an area containing, interalia, woody plants of genus Gossypium;

At a spray volume of 20 gallons per acre: a. 1½0/acre of active ingredient produced 10 percent wilting within 48 hours and 0 percent defoliation within 6 days. b. 0.550/acre of arsenic acid (i.e. $H_3AsO_4$) produced 20 percent wilting within 48 hours and 0 percent defoliation within 6 days. c. a combination of 1½0/acre of active ingredient and 0.550/acre of arsenic acid produced 70 percent wilting within 48 hours and 25 percent defoliation within 6 days.

At higher application rates, the synergism becomes more dramatic and the overall action faster. Again, at a spray volume of 20 gallons per acre: a. 20/acre of active ingredient produced 25 percent wilting within 24 hours and 10 percent defoliation within 10 days. b. 1.470/acre of arsenic acid produced 25 percent wilting within 24 hours and 10 percent defoliation within 10 days. c. a combination of 20 of active ingredient and 1.470 of arsenic acid per acre produced 80 percent wilting within 24 hours and 75 percent defoliation within 10 days.

Comparable synergistic results are obtained with the mixtures of active ingredient and dimethyl arsenic acid. In dense jungle applications, per acre applications of as much as 24 pounds of active ingredient with 6 pounds of either an arsenic acid or dimethyl arsenic acid may be used.

No single formulation or composition is equally suitable for defoliation of all jungles. Wide variations exist in climatic conditions and in the particular genera of woody plants comprising a given jungle. Further, rate and method of application can vary widely depending upon whether desiccation and death of a plant is sought or merely its initial wilting and subsequent defoliation. In general application is preferred under warm and dry conditions but military needs often dictate the time of application. The method of the invention has general application to woody plants and need not be confined to military operations.

Obviously, many modifications and variations of the invention, as hereinbefore set forth, may be made without departing from the spirit and scope thereof. Therefore, only such limitations should be imposed as are indicated in the appended claims.

What we claim is:

1. A method of making a foliar canopy visually penetrable including the step of applying to said canopy, in situ, a composition comprising from about 1 pound to about 24 pounds per acre of 2,3,5,5,-pentachloro-4-keto pentenoic acid, said composition also containing at least one compound selected from the group consisting of the 4-amino-3,5,6-trichloropicolinic acid, arsenic acid, dimethylarsenic acid, 2,4-dichlorophenoxyacetic acid and esters thereof and 2,4,5-trichlorophenoxyacetic acid and esters thereof.

2. The method of claim 1 wherein said composition contains both butyl esters of 2,4-dichlorophenoxyacetic acid and butyl esters of 2,4,5-trichlorophenoxyacetic acid.

3. A composition for causing the foliage of woody plants to wilt and thereafter drop off comprising from about 6 pounds to about 24 pounds per acre of 2,3,5,5,-pentachloro-4-keto pentenoic acid and an additional compound selected from the group consisting of arsenic acid and dimethylarsenic acid, said composition having a greater effect than either of its ingredients vis-a-vis destruction of a foliar canopy.

4. The composition of claim 3 wherein said additional compound is arsenic acid.

* * * * *